US012763500B2

(12) United States Patent
Hashiguchi

(10) Patent No.: US 12,763,500 B2
(45) Date of Patent: Oct. 13, 2026

(54) CONNECTOR AND CONNECTOR ASSEMBLY

(71) Applicant: Japan Aviation Electronics Industry, Limited, Tokyo (JP)

(72) Inventor: Osamu Hashiguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 341 days.

(21) Appl. No.: 18/635,517

(22) Filed: Apr. 15, 2024

(65) Prior Publication Data

US 2024/0421504 A1 Dec. 19, 2024

(30) Foreign Application Priority Data

Jun. 14, 2023 (JP) ................................ 2023-097412

(51) Int. Cl.

*H01R 12/63* (2011.01)
*H01R 4/16* (2006.01)
*H01R 13/41* (2006.01)
*H01R 13/504* (2006.01)

(52) U.S. Cl.

CPC ............... *H01R 12/63* (2013.01); *H01R 4/16* (2013.01); *H01R 13/41* (2013.01); *H01R 13/504* (2013.01)

(58) Field of Classification Search

CPC ........ H01R 13/504; H01R 4/16; H01R 12/81; H01R 12/63
USPC .................................................... 439/581, 77
See application file for complete search history.

(56) References Cited

U.S. PATENT DOCUMENTS 5,264,663 A * 11/1993 Noguchi ................ H01R 12/63 439/465
5,651,694 A * 7/1997 Miyasaka .............. H05K 1/118 439/492
5,717,556 A * 2/1998 Yanagida ............. H05K 3/4691 174/254
6,007,371 A * 12/1999 Hickox ................ H01R 13/506 439/498

(Continued)

FOREIGN PATENT DOCUMENTS

DE 102017208625 B3 * 11/2018 ............. H01R 12/81
DE 102021212194 A1 * 5/2023 ............. H01R 12/63

(Continued)

*Primary Examiner* — Marcus E Harcum
(74) *Attorney, Agent, or Firm* — MUNCY, GEISSLER, OLDS & LOWE, P.C.

(57) ABSTRACT

A connector includes a first insulator having a recessed portion formed in a first retaining surface and a projection formed in the recessed portion to project higher than the first retaining surface, and a second insulator having a protrusion portion formed on a second retaining surface and a projection accommodating portion of recess shape formed in the protrusion portion and is deeper than the second retaining surface, the first insulator and the second insulator being joined to each other such that the projection is inserted in an opening portion of a sheet type conductive member, that the sheet type conductive member and an electric wire are held between the first retaining surface and the second retaining surface, and that the sheet type conductive member and the electric wire are disposed to overlap each other between the recessed portion and the protrusion portion.

11 Claims, 8 Drawing Sheets

(56) References Cited

U.S. PATENT DOCUMENTS

| | | | | |
|---|---|---|---|---|
| 6,520,810 | B1 * | 2/2003 | LePottier | H01R 12/592 439/701 |
| 6,602,092 | B2 * | 8/2003 | Soubh | H01R 12/62 439/493 |
| 6,648,675 | B2 * | 11/2003 | Welschholz | H01R 12/61 439/492 |
| 7,104,834 | B2 * | 9/2006 | Robinson | A61B 18/14 439/495 |
| 10,594,063 | B2 * | 3/2020 | Saoya | H01R 12/67 |
| 11,258,189 | B2 * | 2/2022 | Hashiguchi | H01R 13/502 |
| 2004/0094328 | A1 * | 5/2004 | Fjelstad | H01R 12/714 174/251 |
| 2007/0264872 | A1 * | 11/2007 | Kuroda | H01R 12/63 439/581 |
| 2009/0223041 | A1 * | 9/2009 | Garrison | H01R 12/63 29/755 |
| 2012/0315800 | A1 * | 12/2012 | Tseng | H01R 12/63 439/676 |
| 2024/0178624 | A1 * | 5/2024 | Racho | H01R 13/422 |
| 2024/0291260 | A1 * | 8/2024 | Racho | H01R 12/63 |

FOREIGN PATENT DOCUMENTS

| | | | | |
|---|---|---|---|---|
| EP | 1122823 | A2 * | 8/2001 | H01R 12/63 |
| JP | 2007214087 | A | 8/2007 | |
| WO | WO-2004109862 | A1 * | 12/2004 | H01R 12/592 |

* cited by examiner

CONNECTOR AND CONNECTOR ASSEMBLY

BACKGROUND OF THE INVENTION

The present invention relates to a connector, particularly to a connector connecting a conductor portion of an electric wire to a flexible conductor of a sheet type conductive member.

The present invention also relates to a connector assembly in which a conductor portion of an electric wire is connected to a flexible conductor of a sheet type conductive member by means of the connector.

In recent years, attention has been drawn to so-called smart clothes that can obtain user's biological data such as the heart rate and the body temperature only by being worn by the user. Such smart clothes have an electrode disposed at a measurement site and constituted of a flexible conductor, and when a wearable device serving as a measurement device is electrically connected to the electrode, biological data can be transmitted to the wearable device.

The electrode and the wearable device can be interconnected by, for instance, use of a connector connected to the flexible conductor.

However, when the wearable device is situated away from the measurement site, it is necessary to provide an electric path connecting the electrode disposed at the measurement site to the place where the connector is attached, and if such an electric path is formed from a flexible conductor, this causes higher electric resistance and higher cost.

To interconnect an electrode constituted of a flexible conductor and a wearable device by use of an electric wire that has low electric resistance and is inexpensive, it has been desired to develop a small-sized connector connecting the electric wire to the flexible conductor disposed on a garment.

As a connector for connecting an electric wire to a flexible conductor, for instance, JP 2007-214087 A discloses a connector as shown in FIG. 19. This connector includes: a first connector 2 connected to an end of a sheet type conductive member 1; and a second connector 4 attached to tips of electric wires 3. The electric wires 3 can be connected to a flexible conductor of the sheet type conductive member 1 by fitting the second connector 4 to the first connector 2.

However, the first connector 2 and the second connector 4 to be fitted together are required to connect the electric wires 3 to the flexible conductor of the sheet type conductive member 1, and this causes a larger size of a device; and there is a separatable connection portion between the first connector 2 and the second connector 4, which impairs the reliability of electric connection.

SUMMARY OF THE INVENTION

The present invention has been made to solve the conventional problem described above and aims at providing a connector and a connector assembly that can be smaller in size while reliably connecting a conductor portion of an electric wire to a flexible conductor of a sheet type conductive member.

A connector according to the present invention is one configured to connect a conductor portion of an electric wire to a flexible conductor exposed on at least one surface of a sheet type conductive member having an opening portion, the connector comprising a first insulator including a first retaining surface, a recessed portion formed in the first retaining surface, and a projection formed in the recessed portion to project higher than the first retaining surface, and a second insulator including a second retaining surface that faces the first retaining surface, a protrusion portion that is formed on the second retaining surface and faces the recessed portion, and a projection accommodating portion of recess shape that is formed in the protrusion portion and is deeper than the second retaining surface, wherein the first insulator and the second insulator are joined to each other such that the projection is inserted in the opening portion of the sheet type conductive member, that the sheet type conductive member and the electric wire are held between the first retaining surface and the second retaining surface, and that the sheet type conductive member and the electric wire are disposed to overlap each other between the recessed portion and the protrusion portion, and at least part of the projection is accommodated in the projection accommodating portion, whereby the conductor portion of the electric wire is electrically connected to the flexible conductor of the sheet type conductive member between an outer lateral surface of the projection and an inner lateral surface of the projection accommodating portion.

A connector assembly according to the present invention comprises:

the above-mentioned connector, the sheet type conductive member, and the electric wire, wherein the conductor portion of the electric wire is electrically connected to the flexible conductor of the sheet type conductive member by using the connector.

DETAILED DESCRIPTION OF THE INVENTION

An embodiment of the present invention is described below based on the accompanying drawings.

FIGS. 1 to 4 show a connector assembly according to the embodiment. The connector assembly is obtained by connecting a coated electric wire 13 to a sheet type conductive member 12 by means of a connector 11.

The sheet type conductive member 12 has a top surface and a bottom surface facing in opposite directions from each other and has a flexible conductor 12A exposed at least on the top surface. As the sheet type conductive member 12, conductive cloth woven using a conductive thread such as silver can be used, for example. When such conductive cloth is used, the flexible conductor 12A is exposed not only on the top surface but also on the bottom surface of the sheet type conductive member 12. In addition, one obtained by applying a conductive ink on a surface of cloth having no conductivity by printing or another method to form the flexible conductor 12A on the surface thereof can also be used as the sheet type conductive member 12. Further, a member obtained by forming the flexible conductor 12A formed of a conductive pattern on a surface of an insulating sheet body such as a resin film may be used as the sheet type conductive member 12.

The sheet type conductive member 12 has a band shape extending in a predetermined direction.

The coated electric wire 13 has a structure in which an outer periphery of a conductor portion to be described later is covered with an insulation coating portion. With the connector 11, the conductor portion of the coated electric wire 13 is electrically connected to the flexible conductor 12A of the sheet type conductive member 12.

The coated electric wire 13 extends in the same direction as the direction in which the sheet type conductive member 12 of band shape extends.

For convenience, the predetermined direction in which the sheet type conductive member 12 extends toward the connector 11 is called "−Y direction," the width direction of the sheet type conductive member 12 of band shape "X direction," and the direction orthogonal to an XY plane "Z direction."

Figure 1:
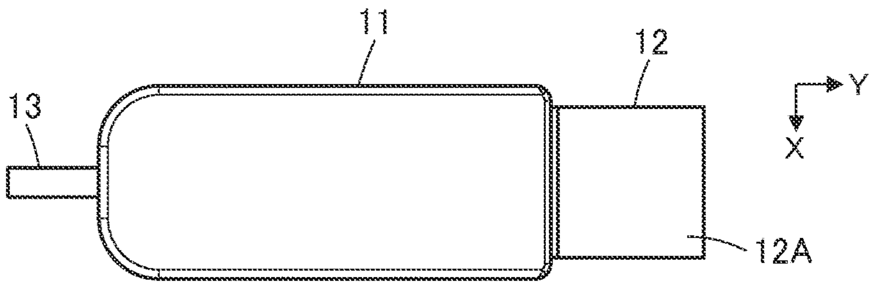
FIG. 1 is a plan view showing a connector assembly according to an embodiment.
Figure 2:
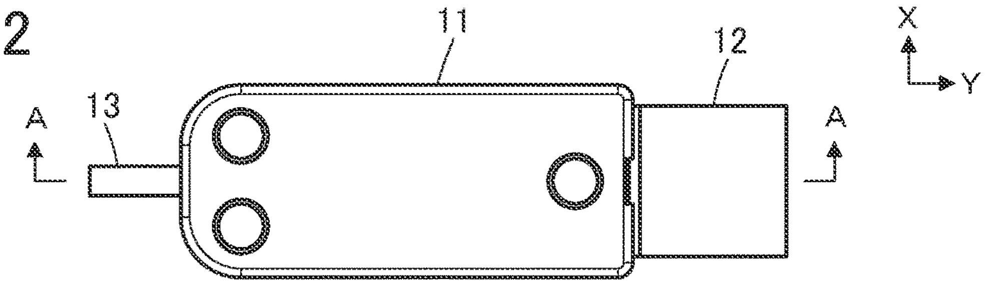
FIG. 2 is a bottom view showing the connector assembly according to the embodiment.
Figure 3:
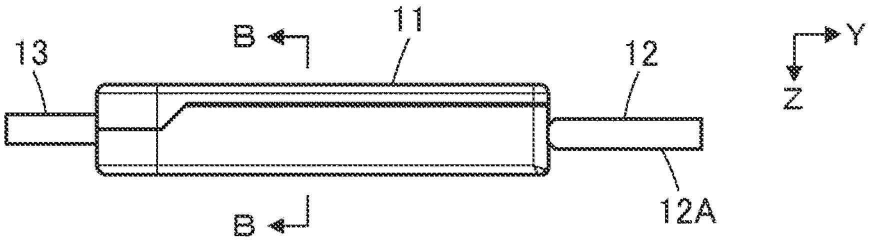
FIG. 3 is a side view showing the connector assembly according to the embodiment.
Figure 4:
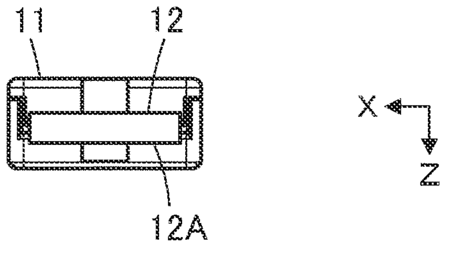
FIG. 4 is a front view showing the connector assembly according to the embodiment.
Figure 5:
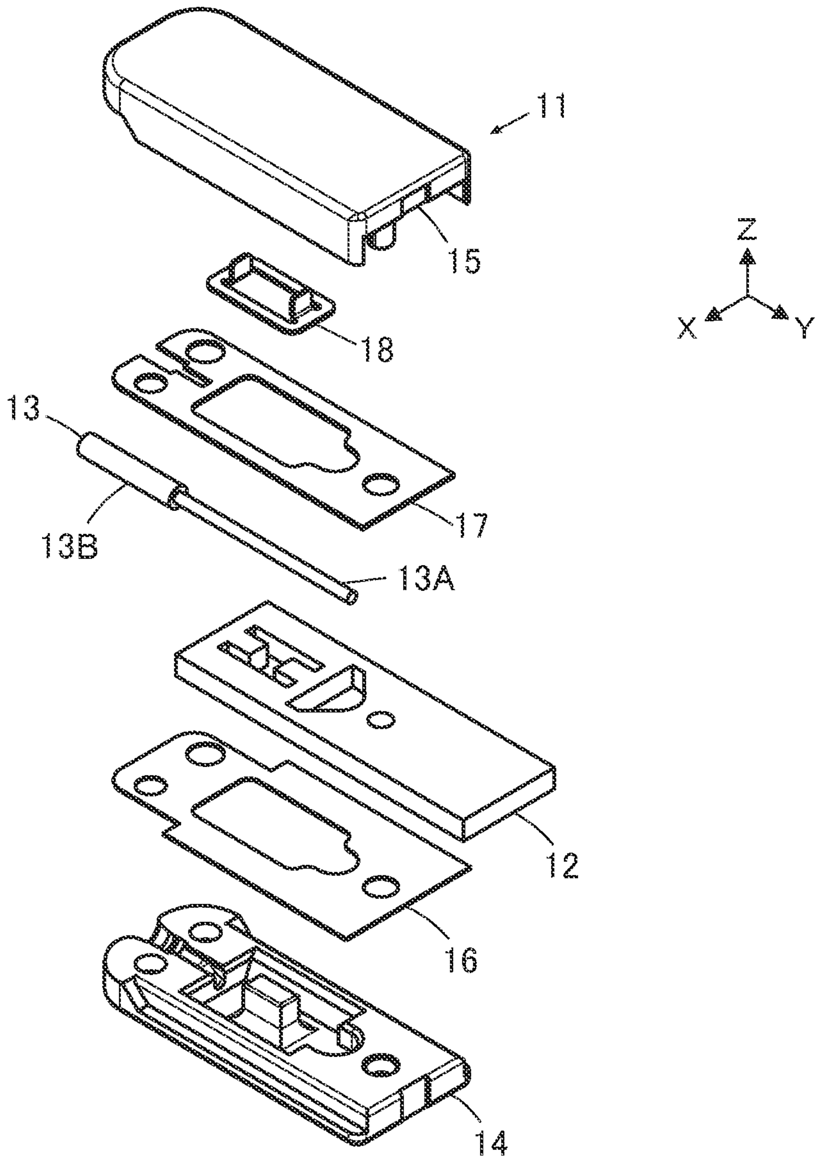
FIG. 5 is an assembly view showing the connector assembly according to the embodiment when viewed from an obliquely upper position.
Figure 6:
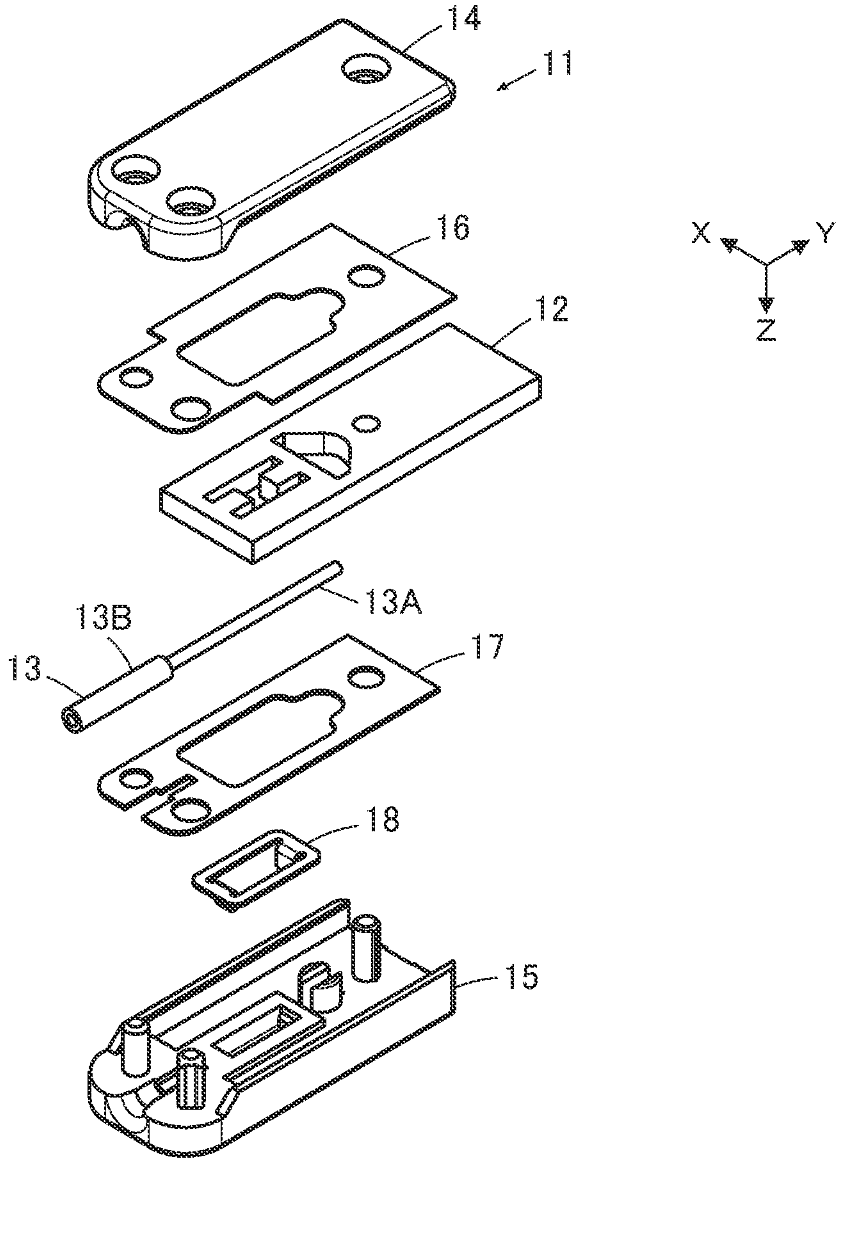
FIG. 6 is an assembly view showing the connector assembly according to the embodiment when viewed from an obliquely lower position.

FIGS. 5 and 6 show assembly views of the connector assembly. The connector assembly includes a first insulator 14 and a second insulator 15.

The sheet type conductive member 12 is disposed on the +Z direction side of the first insulator 14 via a first adhesive sheet 16, and a conductor portion 13A exposed from an insulation coating portion 13B of the coated electric wire 13 is disposed on the +Z direction side of the sheet type conductive member 12. The conductor portion 13A of the coated electric wire 13 may be a so-called solid wire that is formed of one conductor or a so-called stranded wire that is formed by twisting a plurality of conductors.

Further, a contact force ensuring member 18 is disposed on the +Z direction side of the conductor portion 13A of the coated electric wire 13 via a second adhesive sheet 17, and the second insulator 15 is disposed on the +Z direction side of the contact force ensuring member 18.

The first insulator 14, the first adhesive sheet 16, the second adhesive sheet 17, the contact force ensuring member 18, and the second insulator 15 constitute the connector 11.

Figure 7:
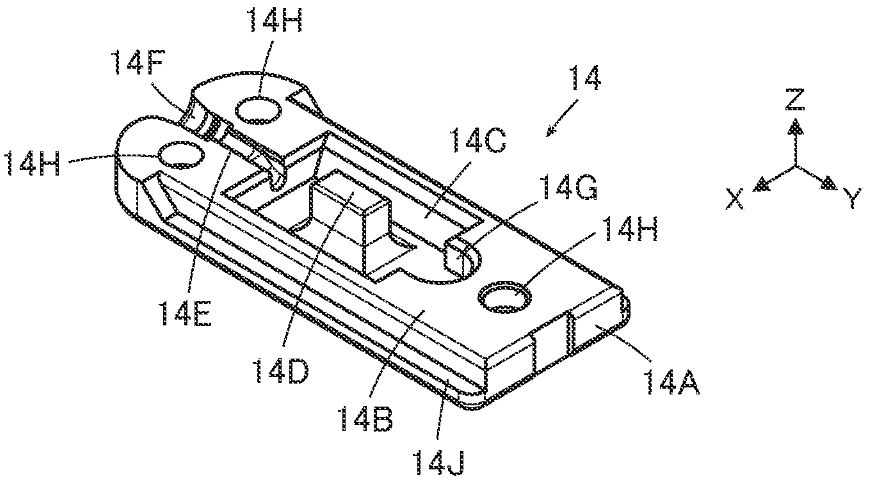
FIG. 7 is a perspective view showing a first insulator used in the connector assembly according to the embodiment.

As shown in FIG. 7, the first insulator 14 includes a flat plate portion 14A of substantially rectangular shape extending along an XY plane, and a +Z directional surface of the flat plate portion 14A forms a first retaining surface 14B of flat shape. The first retaining surface 14B is provided at its center with a recessed portion 14C recessed in the −Z direction. Further, the recessed portion 14C is provided at its center with a projection 14D of substantially prismatic shape projecting toward the +Z direction. The projection 14D projects higher than the first retaining surface 14B in the +Z direction.

In the first retaining surface 14B, an insertion groove 14E is formed to extend in the −Y direction from the recessed portion 14C, and at a −Y directional end portion of the insertion groove 14E, an insertion groove 14F is formed with a larger groove width than that of the insertion groove 14E.

At a +Y directional end portion of the recessed portion 14C, an insertion hole 14G of recess shape is formed to communicate with the recessed portion 14C.

The flat plate portion 14A includes three through-holes 14H separately formed on opposite sides of the insertion groove 14E in the X direction and on the +Y direction side of the insertion hole 14G, the through-holes 14H penetrating the flat plate portion 14A in the Z direction.

In addition, step portions 14J extending in the Y direction are separately formed at X-directional opposite lateral surfaces of the flat plate portion 14A.

Figure 8:
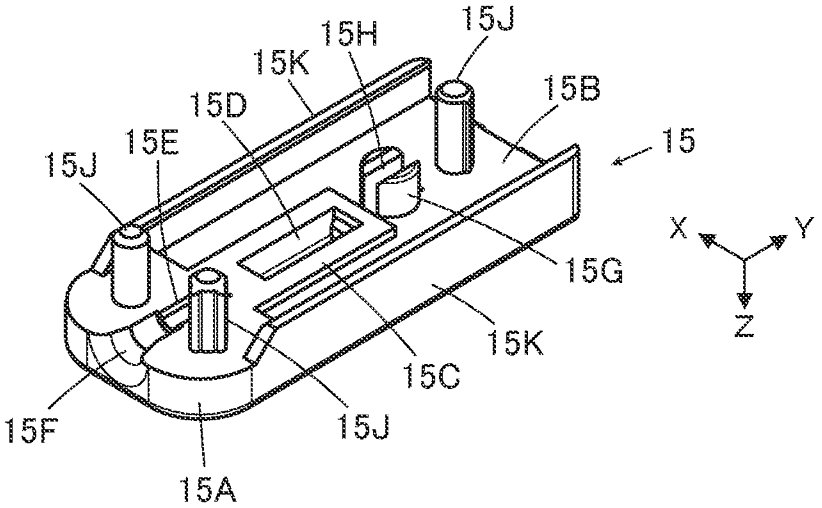
FIG. 8 is a perspective view showing a second insulator used in the connector assembly according to the embodiment when viewed from an obliquely lower position.

As shown in FIG. 8, the second insulator 15 includes a flat plate portion 15A of substantially rectangular shape extending along an XY plane, and a −Z directional surface of the flat plate portion 15A forms a second retaining surface 15B of flat shape. The second retaining surface 15B is provided at its center with a protrusion portion 15C jutting in the −Z direction. Further, the protrusion portion 15C is provided at its center with a projection accommodating portion 15D of recess shape that is recessed in the +Z direction and is deeper than the second retaining surface 15B.

On the −Y directional side of the projection accommodating portion 15D, an insertion groove 15E is formed to extend in the −Y direction, and at a −Y directional end portion of the insertion groove 15E, an insertion groove 15F is formed with a larger groove width than that of the insertion groove 15E.

On the +Y direction side of the protrusion portion 15C, a tip retaining portion 15G of columnar shape is formed to protrude in the −Z direction from the second retaining surface 15B, and a slit 15H is formed in the tip retaining portion 15G to extend in the Y direction so as to divide the tip retaining portion 15G in two in the X direction. The tip retaining portion 15G is to retain a tip of the conductor portion 13A of the coated electric wire 13, and the slit 15H has a slit width slightly smaller than the diameter of the conductor portion 13A of the coated electric wire 13 and is configured such that the conductor portion 13A may be inserted thereinto.

The flat plate portion 15A includes three bosses 15J separately formed on opposite sides of the insertion groove 15E in the X direction and on the +Y direction side of the tip retaining portion 15G, the bosses 15J protruding in the −Z direction.

In addition, at the X-directional opposite lateral portions of the flat plate portion 15A, lateral plates 15K are separately formed to protrude in the −Z direction and extend in the Y direction.

When the first insulator 14 and the second insulator 15 are joined to each other, the insertion groove 14E of the first insulator 14 and the insertion groove 15E of the second insulator 15 work together to retain the conductor portion 13A of the coated electric wire 13, and the insertion groove 14F of the first insulator 14 and the insertion groove 15F of the second insulator 15 work together to retain the insulation coating portion 13B of the coated electric wire 13 so as to constitute an insulation coat retaining portion.

Figure 9:
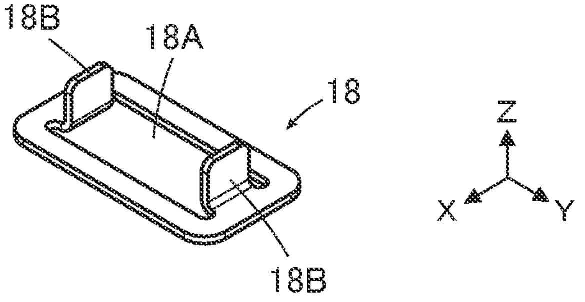
FIG. 9 is a perspective view showing a contact force ensuring member used in the connector assembly according to the embodiment.

The contact force ensuring member 18 is to ensure a contact force between the conductor portion 13A of the coated electric wire 13 and the flexible conductor 12A of the sheet type conductive member 12. As shown in FIG. 9, the contact force ensuring member 18 is formed of a metal sheet being bent and includes a projection penetrating hole 18A which the projection 14D of the first insulator 14 penetrates, and a pair of pressing portions 18B facing each other in the Y direction across the projection penetrating hole 18A and protruding in the +Z direction.

Figure 10:
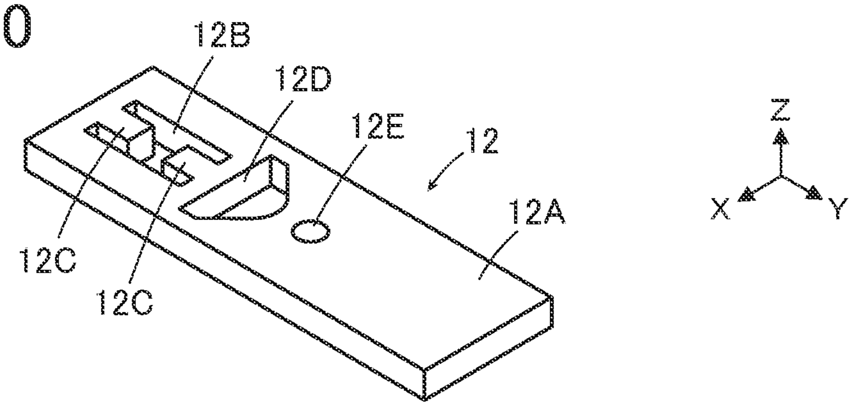
FIG. 10 is a perspective view showing a sheet type conductive member used in the connector assembly according to the embodiment.

As shown in FIG. 10, the sheet type conductive member 12 has an H-shaped opening portion 12B penetrating the sheet type conductive member 12 in the Z direction, and a pair of projecting portions 12C are formed to project from Y directional opposite edges of the opening portion 12B toward the inside of the opening portion 12B and face each other in the Y direction.

Further, the sheet type conductive member 12 is provided with through-holes 12D and 12E respectively corresponding to the tip retaining portion 15G and a +Y directional boss 15J of the second insulator 15 and penetrating the sheet type conductive member 12 in the Z direction.

Figure 11:
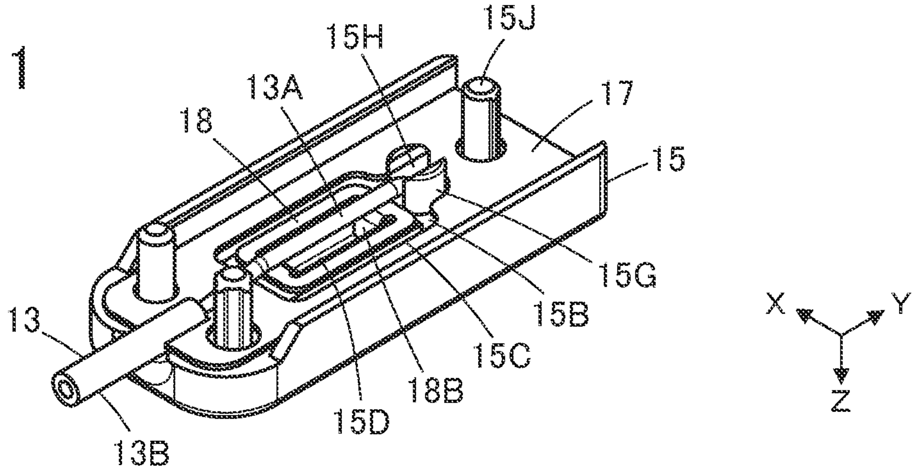
FIG. 11 is a perspective view showing a state where a second adhesive sheet, the contact force ensuring member, and a conductive portion of an electric wire are disposed on the second insulator.

When the connector 11 is assembled to produce the connector assembly, first, as shown in FIG. 11, the second adhesive sheet 17 is disposed on the second retaining surface 15B of the second insulator 15. The second adhesive sheet 17 has an opening portion corresponding to the protrusion portion 15C and the tip retaining portion 15G of the second insulator 15 and three opening portions separately corresponding to the three bosses 15J. The second adhesive sheet 17 is disposed on the second retaining surface 15B in the state where the protrusion portion 15C, the tip retaining portion 15G, and the three bosses 15J penetrate through these opening portions.

In addition, the contact force ensuring member 18 is disposed on the protrusion portion 15C of the second insulator 15, and the pair of pressing portions 18B of the contact force ensuring member 18 are inserted into the projection accommodating portion 15D of the second insulator 15 along Y directional inner lateral surfaces of the projection accommodating portion 15D.

Further, the conductor portion 13A exposed as a result of removal of a portion of the insulation coating portion 13B at a +Y directional end portion of the coated electric wire 13 is disposed on the contact force ensuring member 18, and the tip of the conductor portion 13A is press-fitted in the slit 15H formed in the tip retaining portion 15G of the second insulator 15, thereby being temporarily retained in the tip retaining portion 15G.

Figure 12:
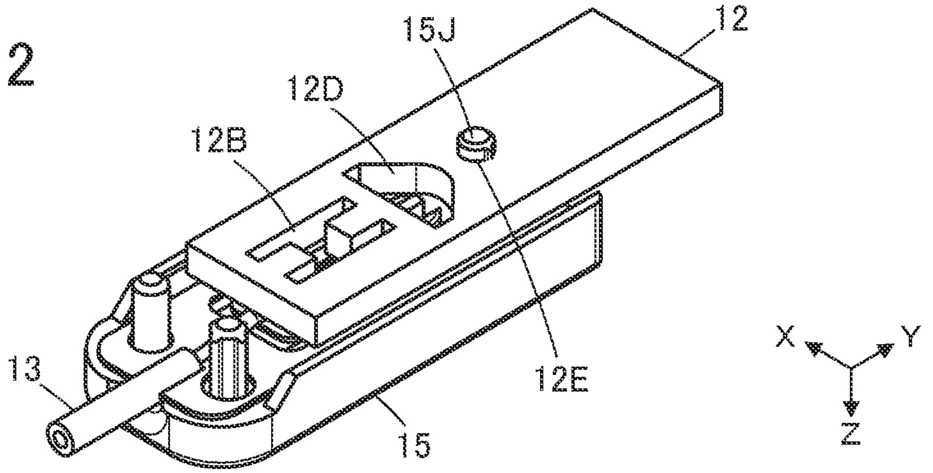
FIG. 12 is a perspective view showing a state where the sheet type conductive member is disposed on the second insulator.

Next, as shown in FIG. 12, the sheet type conductive member 12 is disposed on the second insulator 15 while the +Y directional boss 15J of the second insulator 15 penetrates the through-hole 12E of the sheet type conductive member 12.

Figure 13:
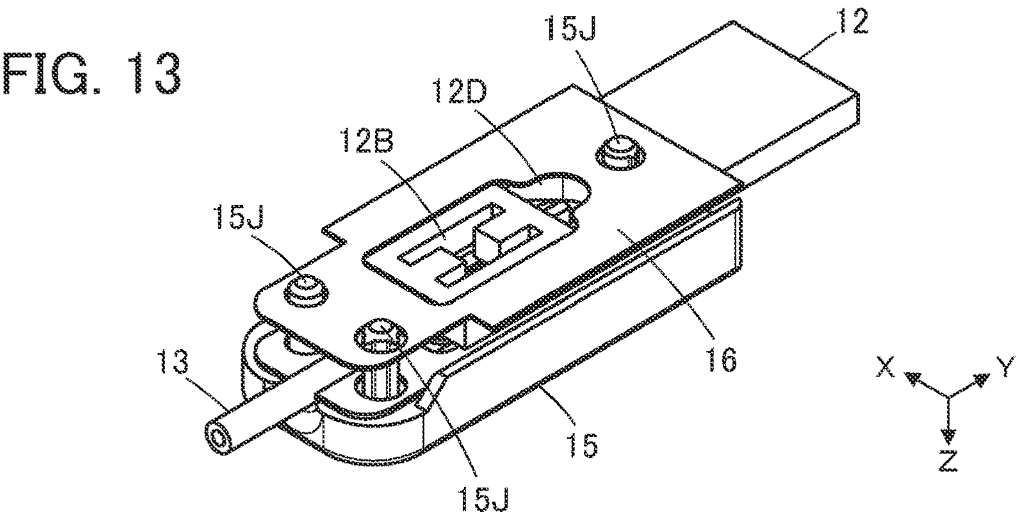
FIG. 13 is a perspective view showing a state where a first adhesive sheet is disposed on the sheet type conductive member.

Further, as shown in FIG. 13, the first adhesive sheet 16 is disposed on the sheet type conductive member 12. The first adhesive sheet 16 has an opening portion corresponding to the opening portion 12B and the through-hole 12D of the sheet type conductive member 12 and three opening portions separately corresponding to the three bosses 15J of the second insulator 15. The first adhesive sheet 16 is disposed on the sheet type conductive member 12 in the state where the three bosses 15J penetrate the corresponding opening portions.

Figure 14:
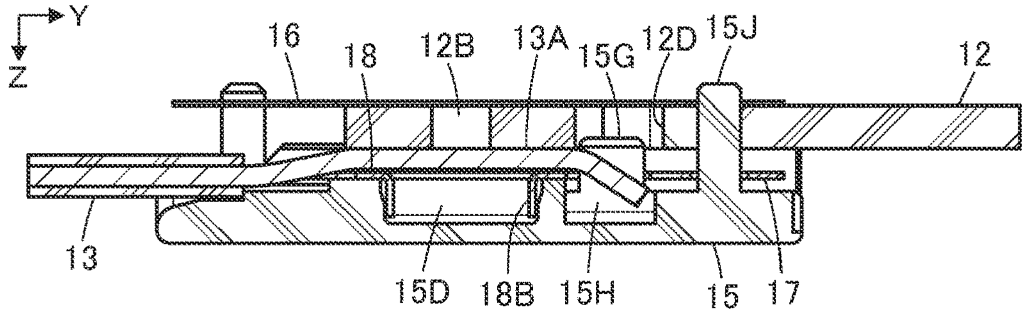
FIG. 14 is a cross-sectional view showing the state where the first adhesive sheet is disposed on the sheet type conductive member.

At this time, as shown in FIG. 14, the conductor portion 13A of the coated electric wire 13 extends in the Y direction above the projection accommodating portion 15D of the second insulator 15, and the +Y directional tip of the conductor portion 13A is press-fitted in the slit 15H of the tip retaining portion 15G of the second insulator 15. Further, the H-shaped opening portion 12B of the sheet type conductive member 12 is situated on the conductor portion 13A extending in the Y direction above the projection accommodating portion 15D of the second insulator 15. The opening portion 12B of the sheet type conductive member 12 is exposed toward the −Z direction through the corresponding opening portion of the first adhesive sheet 16.

Figure 15:
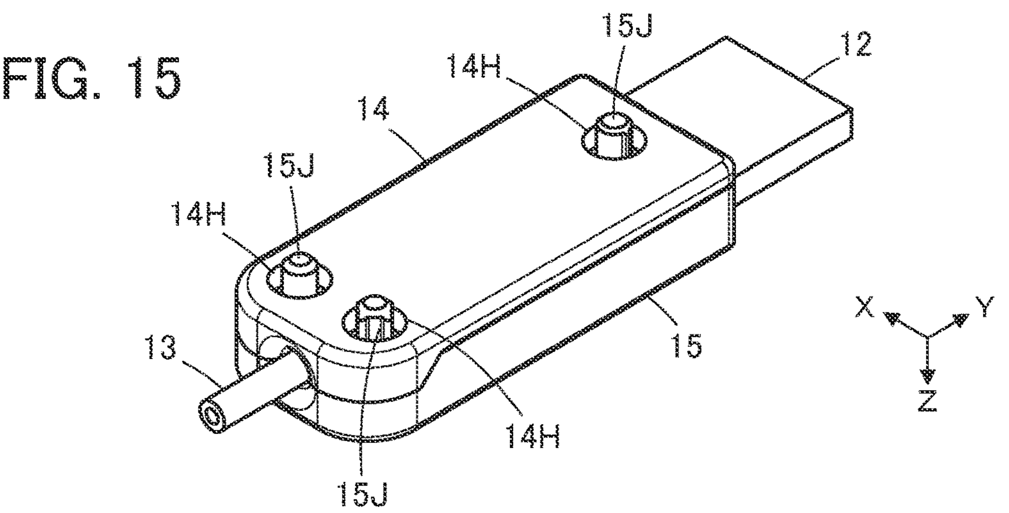
FIG. 15 is a perspective view showing a state where the first insulator is disposed on the second insulator.

In this state, the first insulator 14 is pressed toward the second insulator 15 relatively in the +Z direction, whereby the first insulator 14 is disposed on the second insulator 15 while the three bosses 15J of the second insulator 15 separately penetrate the three through-holes 14H of the first insulator 14 as shown in FIG. 15. Consequently, the sheet type conductive member 12 and the conductor portion 13A of the coated electric wire 13 are sandwiched between the first retaining surface 14B of the first insulator 14 and the second retaining surface 15B of the second insulator 15.

Figure 16:
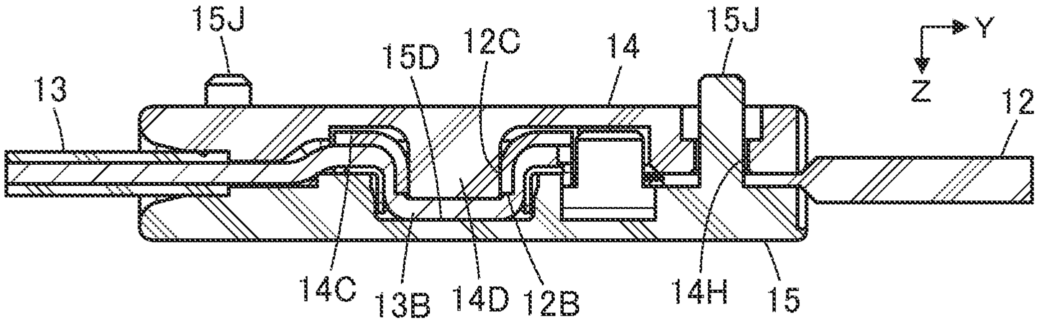
FIG. 16 is a cross-sectional view showing the state where the first insulator is disposed on the second insulator.

At this time, as shown in FIG. 16, the projection 14D formed to project in the recessed portion 14C of the first insulator 14 is inserted into the H-shaped opening portion 12B of the sheet type conductive member 12, and is accommodated in the projection accommodating portion 15D of the second insulator 15 while a +Z directional end portion of the projection 14D pushes the pair of projecting portions 12C of the sheet type conductive member 12 and the conductor portion 13A of the coated electric wire 13.

The three bosses 15J of the second insulator 15 penetrate the three through-holes 14H of the first insulator 14 and project on the −Z direction side from the first insulator 14.

When a heat treatment is performed to melt the first adhesive sheet 16 and the second adhesive sheet 17 while the first insulator 14 is kept to be pressed against the second insulator 15, the first insulator 14 and the second insulator 15 are adhered to each other directly or via the sheet type conductive member 12, and a portion between the first insulator 14 and the second insulator 15 is sealed. Further, tips of the three bosses 15J projecting on the −Z direction side of the first insulator 14 are thermally deformed, whereby the first insulator 14 and the second insulator 15 are fixed to each other. Thus, the assembling operation of the connector 11 is completed.

Figure 17:
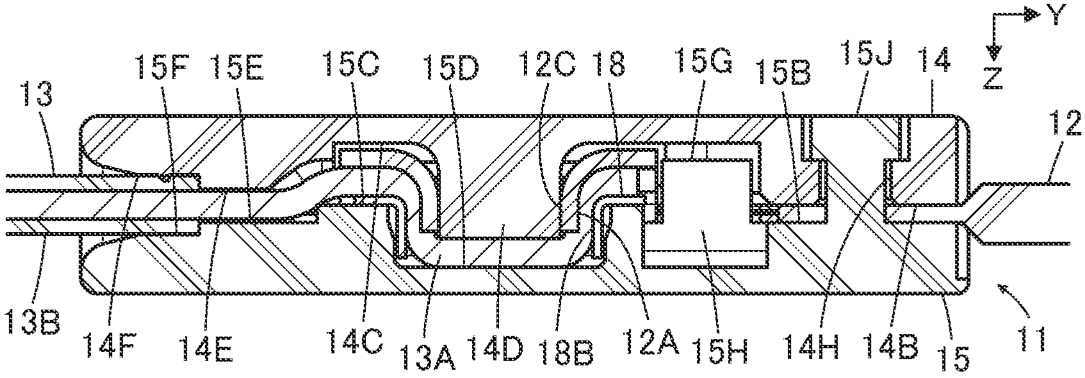
FIG. 17 is a cross-sectional view taken along line A-A in FIG. 2.

FIG. 17 shows the thus-produced connector assembly. While the projection 14D of the first insulator 14 is accommodated in the projection accommodating portion 15D of the second insulator 15 with the +Z directional end portion of the projection 14D pushing the pair of projecting portions 12C of the sheet type conductive member 12 and the conductor portion 13A of the coated electric wire 13, the pair of pressing portions 18B of the contact force ensuring member 18 are inserted in the projection accommodating portion 15D. Therefore, each projecting portion 12C of the sheet type conductive member 12 deforms to conform to a surface of the projection 14D, and the conductor portion 13A of the coated electric wire 13 is held between a surface of the projecting portion 12C of the sheet type conductive member 12 and the corresponding pressing portion 18B of the contact force ensuring member 18 to be bent to conform to the surface of the deformed projecting portion 12C of the sheet type conductive member 12.

Since the projection 14D has a substantially prismatic shape, each projecting portion 12C, deformed to conform to the surface of the projection 14D, of the sheet type conductive member 12 and the conductor portion 13A of the coated electric wire 13 are held between the corresponding pressing portion 18B of the contact force ensuring member 18 extending along a Y directional inner lateral surface of the projection accommodating portion 15D and a Y directional outer lateral surface of the projection 14D, and the conductor portion 13A of the coated electric wire 13 contacts the flexible conductor 12A exposed on the surface of the projecting portion 12C of the sheet type conductive member 12 with a predetermined contact force and is electrically connected to the flexible conductor 12A.

In a −Y directional portion of the connector 11, the conductor portion 13A of the coated electric wire 13 is retained in the insertion groove 14E of the first insulator 14 and the insertion groove 15E of the second insulator 15, while the insulation coating portion 13B of the coated electric wire 13 is retained in the insertion groove 14F of the first insulator 14 and the insertion groove 15F of the second insulator 15.

In addition, the conductor portion 13A of the coated electric wire 13 is bent to conform to the surface of the deformed projecting portions 12C of the sheet type conductive member 12, whereby the tip of the conductor portion 13A temporarily retained in the slit 15H of the tip retaining portion 15G of the second insulator 15 is pulled out from the slit 15H.

Figure 18:
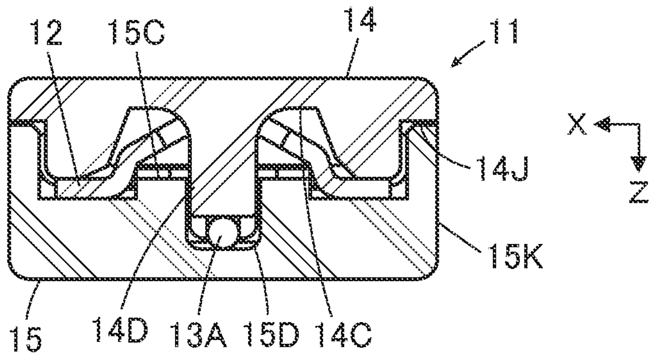
FIG. 18 is a cross-sectional view taken along line B-B in FIG. 3.
Figure 19:
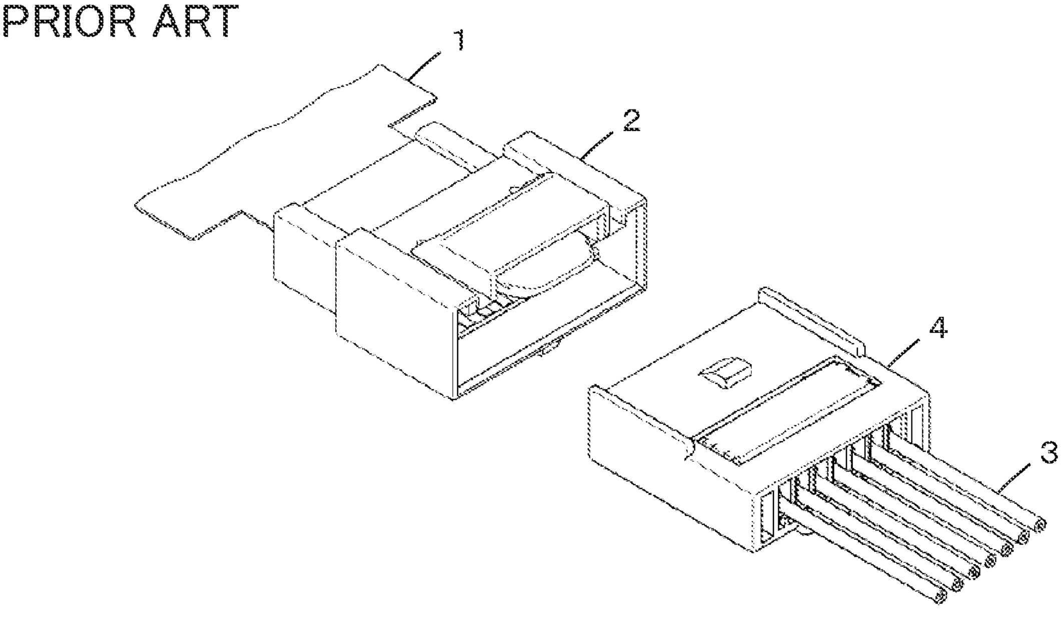
FIG. 19 PRIOR ART
FIG. 19 is a perspective view showing a conventional connector.

Further, as shown in FIG. 18, the pair of lateral plates 15K of the second insulator 15 are fitted in the pair of step portions 14J of the first insulator 14.

Thus, with the connector 11 according to the embodiment, the projection 14D of the first insulator 14 is inserted in the inside of the contact force ensuring member 18 that is inserted in the projection accommodating portion 15D of the second insulator 15 while pushing the sheet type conductive member 12 and the conductor portion 13A of the coated electric wire 13, whereby the flexible conductor 12A exposed on the top surface of the sheet type conductive member 12 is electrically connected to the conductor portion 13A of the coated electric wire 13. Hence, the connector can reduce the size thereof while improving reliability of the electric connection between the flexible conductor 12A and the conductor portion 13A.

In particular, since the projection 14D of the first insulator 14 is inserted in the opening portion 12B of the sheet type conductive member 12, and each projecting portion 12C of the sheet type conductive member 12 contacts the conductor portion 13A of the coated electric wire 13 between the inner lateral surface of the projection accommodating portion 15D of the second insulator 15 and the outer lateral surface of the projection 14D, only the conductor portion 13A of the coated electric wire 13 is disposed between a +Z directional top portion of the projection 14D and a bottom portion of the projection accommodating portion 15D, with the sheet type conductive member 12 being not present therebetween. Further, while the pair of pressing portions 18B of the contact force ensuring member 18 are inserted in the projection accommodating portion 15D, these pressing portions 18B do not extend between the +Z directional top portion of the projection 14D and the bottom portion of the projection accommodating portion 15D. Therefore, the connector 11 can be reduced in thickness.

In addition, the first insulator 14 includes the recessed portion 14C formed in the first retaining surface 14B and the projection 14D formed in the recessed portion 14C to project higher than the first retaining surface 14B in the +Z direction, and the second insulator 15 includes the protrusion portion 15C formed on the second retaining surface 15B and the projection accommodating portion 15D of recess shape formed in the protrusion portion 15C to be deeper than the second retaining surface 15B. Therefore, the first insulator 14 other than the projection 14D is not entirely thinned, but a part of the first insulator 14 within the region where the recessed portion 14C is formed, other than the projection 14D, is thinned, and further, the part of the second insulator 15 where the projection accommodating portion 15D is formed is thinned, whereby the thin connector 11 can be achieved.

Thus, by limiting parts required to be thinned in the first insulator 14 and the second insulator 15, the first insulator 14 and the second insulator 15 can be molded with an insulating resin without impairing fluidity of a melted resin in a mold.

In addition, by limiting parts required to be thinned, the intensity of the first insulator 14 and the second insulator 15 can be ensured, and even when an external force is applied to the connector 11 via the coated electric wire 13 or the sheet type conductive member 12, the occurrence of breakage or the like can be avoided.

In addition, since the first adhesive sheet 16 and the second adhesive sheet 17 are used to seal between the first insulator 14 and the second insulator 15, it is possible to prevent entry of water into a site of electric connection between the flexible conductor 12A of the sheet type conductive member 12 and the conductor portion 13A of the coated electric wire 13.

When the connector 11 of the embodiment is applied to smart clothes, and an electrode (not shown) is connected to the flexible conductor 12A of the sheet type conductive member 12, the electrode disposed at a measurement position and a wearable device can be connected to each other by means of the inexpensive coated electric wire 13 with low electric resistance.

While in the embodiment described above, the tip retaining portion 15G for retaining the tip of the conductor portion 13A of the coated electric wire 13 is formed in the second insulator 15, the tip retaining portion may be formed in the first insulator 14.

In addition, while the three bosses 15J of the second insulator 15 penetrate the three through-holes 14H of the first insulator 14 in the embodiment described above, it is possible to configure the connector such that, conversely, a plurality of bosses formed in the first insulator 14 penetrate a plurality of through-holes formed in the second insulator 15.

In the embodiment described above, the pair of pressing portions 18B of the contact force ensuring member 18 is inserted in the projection accommodating portion 15D of the second insulator 15, and each projecting portion 12C of the sheet type conductive member 12 and the conductor portion 13A of the coated electric wire 13 are held between the outer lateral surface of the projection 14D and the corresponding pressing portion 18B of the contact force ensuring member 18, but the invention is not limited thereto.

Even when it is configured such that each projecting portion 12C of the sheet type conductive member 12 and the conductor portion 13A of the coated electric wire 13 are directly held between the outer lateral surface of the projection 14D and the inner lateral surface of the projection accommodating portion 15D without using the contact force ensuring member 18, the conductor portion 13A of the coated electric wire 13 can be brought into contact with and electrically connected to the flexible conductor 12A exposed on the top surface of the projecting portion 12C of the sheet type conductive member 12. However, the contact force ensuring member 18 is preferably used because a contact force between the conductor portion 13A of the coated electric wire 13 and the flexible conductor 12A of the sheet type conductive member 12 is reliably ensured.

While the coated electric wire 13 is used as an electric wire to be connected to the sheet type conductive member 12 in the embodiment described above, an electric wire formed of only the conductor portion 13A whose outer periphery is not covered with the insulation coating portion 13B made of an insulating material may also be connected to the sheet type conductive member 12.

Further, in the embodiment described above, one projection 14D formed in the first insulator 14 is accommodated in one projection accommodating portion 15D formed in the second insulator 15 to thereby connect the conductor portion 13A of one coated electric wire 13 to the flexible conductor 12A of one sheet type conductive member 12, but the connector can be configured such that, using the first insulator having a plurality of projections and the second insulator having a plurality of projection accommodating portions, conductor portions of a plurality of electric wires are connected to flexible conductors of a plurality of sheet type conductive members in a similar manner.

What is claimed is:

1. A connector configured to connect a conductor portion of an electric wire to a flexible conductor exposed on at least one surface of a sheet type conductive member having an opening portion, the connector comprising:

a first insulator including a first retaining surface, a recessed portion formed in the first retaining surface, and a projection formed in the recessed portion to project higher than the first retaining surface; and a second insulator including a second retaining surface that faces the first retaining surface, a protrusion portion that is formed on the second retaining surface and faces the recessed portion, and a projection accommodating portion of recess shape that is formed in the protrusion portion and is deeper than the second retaining surface, wherein the first insulator and the second insulator are joined to each other such that the projection is inserted in the opening portion of the sheet type conductive member, that the sheet type conductive member and the electric wire are held between the first retaining surface and the second retaining surface, and that the sheet type conductive member and the electric wire are disposed to overlap each other between the recessed portion and the protrusion portion, and at least part of the projection is accommodated in the projection accommodating portion, whereby the conductor portion of the electric wire is electrically connected to the flexible conductor of the sheet type conductive member between an outer lateral surface of the projection and an inner lateral surface of the projection accommodating portion.

2. The connector according to claim 1, wherein the sheet type conductive member extends in a predetermined direction from the first insulator and the second insulator along the first retaining surface and the second retaining surface, and the electric wire extends in an opposite direction of the predetermined direction from the first insulator and the second insulator along the first retaining surface and the second retaining surface.

3. The connector according to claim 1, wherein the first insulator and the second insulator are adhered to each other directly or via the sheet type conductive member.

4. The connector according to claim 1, further comprising a contact force ensuring member for ensuring a contact force between the conductor portion and the flexible conductor, the contact force ensuring member being disposed on an outside of the conductor portion and the flexible conductor that are in contact with each other in the projection accommodating portion.

5. The connector according to claim 4, wherein the contact force ensuring member is formed of a bent metal sheet and includes a projection penetrating hole which the projection of the first insulator penetrates, and a pair of pressing portions that face each other across the projection penetrating hole.

6. The connector according to claim 1, wherein one of the first insulator and the second insulator includes a tip retaining portion for retaining a tip of the conductor portion of the electric wire.

7. The connector according to claim 6, wherein the tip retaining portion includes a slit in which the tip of the conductor portion is inserted.

8. The connector according to claim 6, wherein the electric wire includes an insulation coating portion which covers an outer periphery of the conductor portion, and the first insulator and the second insulator have an insulation coat retaining portion for retaining the insulation coating portion of the electric wire.

9. The connector according to claim 1, wherein one of the first insulator and the second insulator includes a boss, another one of the first insulator and the second insulator includes a boss through-hole which the boss penetrates, and a head of the boss having penetrated the boss through-hole is thermally deformed.

10. A connector assembly comprising:

the connector according to claim 1;

the sheet type conductive member; and the electric wire, wherein the conductor portion of the electric wire is electrically connected to the flexible conductor of the sheet type conductive member by using the connector.

11. The connector assembly according to claim 10, wherein the sheet type conductive member includes the opening portion of H-shape, and a pair of projecting portions projecting from edge portions of the opening portion facing each other toward an inside of the opening portion, the flexible conductor being exposed on the pair of projecting portions, and the conductor portion of the electric wire is electrically connected to the flexible conductor on the pair of projecting portions between an inner lateral surface of the projection accommodating portion and an outer lateral surface of the projection of the connector.

* * * * *